US011525611B2

(12) United States Patent
Sugimura et al.

(10) Patent No.: US 11,525,611 B2
(45) Date of Patent: Dec. 13, 2022

(54) REFRIGERATION CYCLE DEVICE FOR VEHICLE

(71) Applicant: DENSO CORPORATION, Kariya (JP)

(72) Inventors: Kengo Sugimura, Kariya (JP); Satoshi Ito, Kariya (JP); Yuichi Kami, Kariya (JP); Hiroyuki Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/110,641

(22) Filed: Dec. 3, 2020

(65) Prior Publication Data

US 2021/0108841 A1 Apr. 15, 2021

Related U.S. Application Data

(63) Continuation of application No. PCT/JP2019/021953, filed on Jun. 3, 2019.

(30) Foreign Application Priority Data

Jun. 8, 2018 (JP) .............................. JP2018-110428

(51) Int. Cl.
*F25B 41/31* (2021.01)
*F25B 13/00* (2006.01)
*F25B 49/02* (2006.01)

(52) U.S. Cl.
CPC .............. *F25B 41/31* (2021.01); *F25B 13/00* (2013.01); *F25B 49/02* (2013.01)

(58) Field of Classification Search
CPC .......... F25B 41/31; F25B 13/00; F25B 49/02; B60H 1/00278
See application file for complete search history.

(56) References Cited

U.S. PATENT DOCUMENTS

2007/0151270 A1 7/2007 Matsunaga et al.
2015/0013367 A1 1/2015 Carpenter
(Continued)

FOREIGN PATENT DOCUMENTS

DE  112013001769 T5  2/2015
DE  112013005304 T5  7/2015
(Continued)

OTHER PUBLICATIONS

Yoshinori, Vehicle Air-conditioning System, 2013, Full Document (Year: 2013).*
(Continued)

*Primary Examiner* — Nael N Babaa
(74) *Attorney, Agent, or Firm* — Harness, Dickey & Pierce, P.L.C.

(57) ABSTRACT

A refrigerant cycle device includes a compressor, a radiator, a first expansion valve, a second expansion valve, a first evaporator, a second evaporator, and a controller. The controller is configured to switch between a first evaporator priority control and a second evaporator priority control. During the first evaporator priority control, the controller controls a throttle opening of the second expansion valve based on at least one of a temperature of a first evaporator, a temperature of a refrigerant flowing through the first evaporator, and a temperature of an air having exchanged heat in the first evaporator. During the second evaporator priority mode, the controller controls the throttle opening based on a refrigerant state of the second evaporator. When the at least one of the temperatures is equal to or greater than a switching temperature, the second priority mode is switched to the first priority mode.

7 Claims, 6 Drawing Sheets

(56) References Cited

U.S. PATENT DOCUMENTS

2015/0135742 A1 5/2015 Rousseau et al.
2015/0295285 A1 10/2015 Takeuchi et al.

FOREIGN PATENT DOCUMENTS

| JP | 2007163074 A | | 6/2007 | |
|----|--------------|---|--------|---|
| JP | 2008196775 A | | 8/2008 | |
| JP | 2013189118 A | * | 9/2013 | |
| JP | 2015120505 A | | 7/2015 | |
| WO | WO-2014073151 A1 | * | 5/2014 | ......... B60H 1/00278 |

OTHER PUBLICATIONS

Takeuchi, Refrigeration cycle device, 2012, Full Document (Year: 2012).*

* cited by examiner

2ND EXPANSION VALVE OPERATION

REFRIGERATION CYCLE DEVICE FOR VEHICLE

CROSS REFERENCE TO RELATED APPLICATION

The present application is a continuation application of International Patent Application No. PCT/JP2019/021953 filed on Jun. 3, 2019, which designated the U.S. and claims the benefit of priority from Japanese Patent Application No. 2018-110428 filed on Jun. 8, 2018. The entire disclosures of all of the above applications are incorporated herein by reference.

TECHNICAL FIELD

The present disclosure relates to a refrigeration cycle device for a vehicle that cools an air and a battery.

BACKGROUND

A refrigeration cycle device for a vehicle cools an air to be blown into a vehicle cabin and a battery. Specifically, an air-cooling evaporator and a battery-cooling heat exchanger are disposed in parallel with each other in a flow direction of a refrigerant.

SUMMARY

A refrigeration cycle device includes a compressor, a radiator, a first expansion valve, a second expansion valve, a first evaporator, a second evaporator, and a controller.

The compressor is configured to draw and discharge a refrigerant. The radiator is configured to radiate a heat of the refrigerant discharged from the compressor. The first expansion valve and the second expansion valve are disposed in parallel with each other in a flow direction of the refrigerant and configured to decompress the refrigerant having released the heat in the radiator. The first evaporator is configured to exchange heat between the refrigerant having been decompressed by the first expansion valve and an air to be blown into a vehicle cabin to evaporate the refrigerant. The second evaporator is configured to exchange heat between the refrigerant having been decompressed by the second expansion valve and a heat medium for cooling a battery. The controller is configured to control a throttle opening of the second expansion valve.

The controller is configured to switch between a second evaporator priority mode and a first evaporator priority mode. During the second evaporator priority mode, the controller controls the throttle opening of the second expansion valve based on a refrigerant state in the second evaporator. During the first evaporator priority mode, the controller controls the throttle opening of the second expansion valve based on at least one of a temperature of the first evaporator, a temperature of the refrigerant flowing through the first evaporator, and a temperature of the air having exchanged heat in the first evaporator.

The controller is configured to switch the second evaporator priority mode to the first evaporator priority mode when the at least one of the temperature of the first evaporator, the temperature of the refrigerant flowing through the first evaporator, and the temperature of the air having exchanged heat in the first evaporator is equal to or higher than a switching temperature during the second evaporator priority mode.

DETAILED DESCRIPTION

Figure 1:
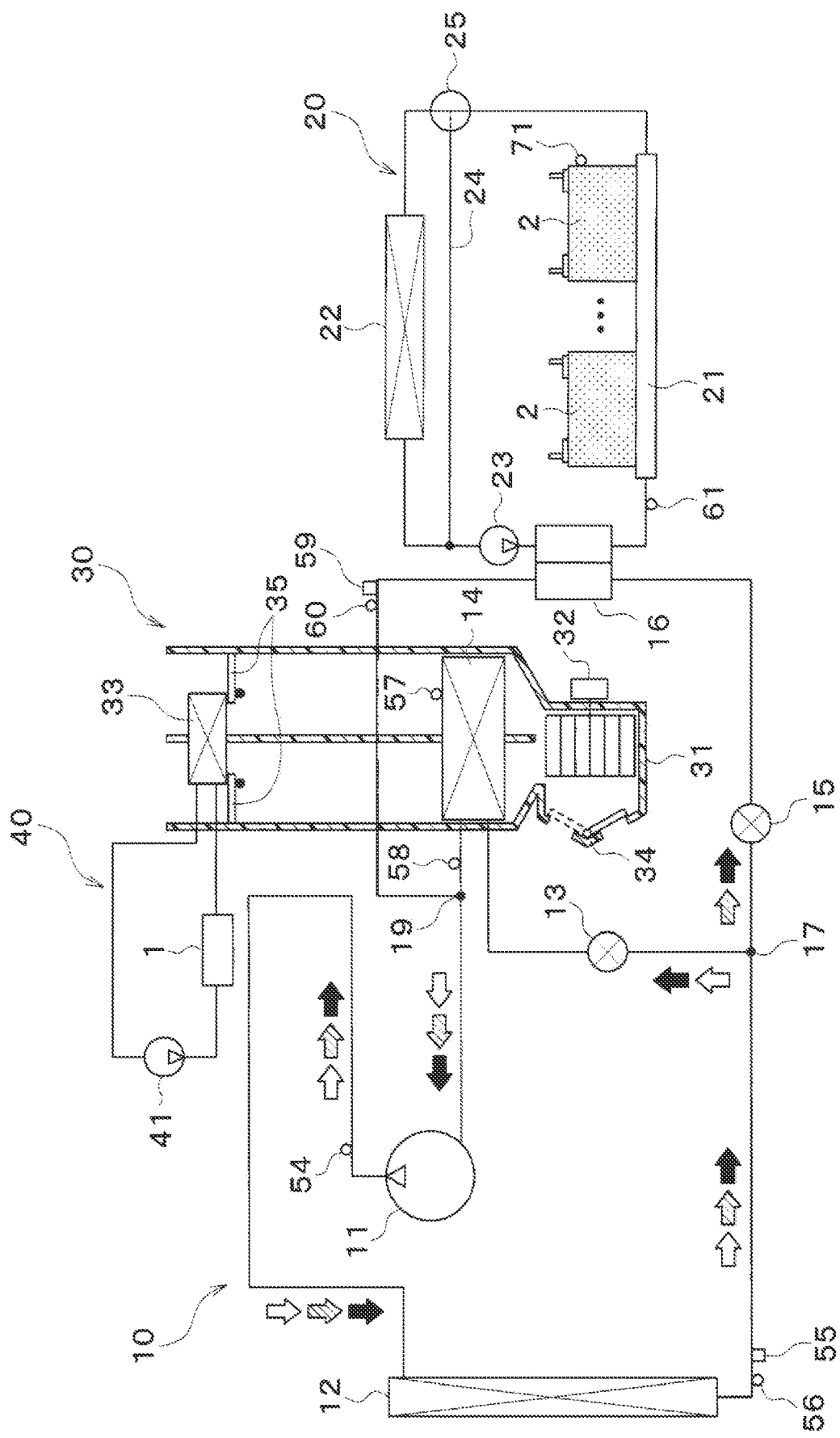
FIG. 1 is an entire configuration diagram of a refrigeration cycle device in a first embodiment.

To begin with, examples of relevant techniques will be described.

A refrigeration cycle device for a vehicle cools an air to be blown into a vehicle cabin and a battery.

Specifically, an air-cooling evaporator and a battery-cooling heat exchanger are disposed in parallel with each other in a flow direction of a refrigerant.

However, according to the above-mentioned prior art, when both a capacity required for air-cooling and a capacity required for battery-cooling increase (e.g., when the vehicle travels at high speed in summer), the respective capacities cannot be satisfied.

For example, since the refrigerant flows in parallel through the air-cooling evaporator and the battery-cooling heat exchanger, when both the air-cooling and the battery-cooling are performed in summer, the flow rate of the refrigerant flowing through the air-cooling evaporator is reduced compared to a case where the battery-cooling are not performed. Thus, the capacity for air-cooling is reduced.

As a result, the temperature of air to be blown into the vehicle cabin may increase, which affects a cooling comfortability, and dehumidification capacity may decrease, which affects an antifogging property. Alternatively, the temperature of the battery may increase and the battery may deteriorate faster.

In view of the above points, it is objective of the present disclosure to secure both the capacity for air-cooling and the capacity for battery-cooling.

To achieve above-described object, according to a first aspect of the present disclosure, a refrigeration cycle device includes a compressor, a radiator, a first expansion valve, a second expansion valve, a first evaporator, a second evaporator, and a controller.

The compressor is configured to draw and discharge a refrigerant. The radiator is configured to radiate a heat of the refrigerant discharged from the compressor. The first expansion valve and the second expansion valve are disposed in parallel with each other in a flow direction of the refrigerant and configured to decompress the refrigerant having released the heat in the radiator. The first evaporator is configured to exchange heat between the refrigerant having been decompressed by the first expansion valve and an air to be blown into a vehicle cabin to evaporate the refrigerant. The second evaporator is configured to exchange heat between the refrigerant having been decompressed by the second expansion valve and a heat medium for cooling a battery. The controller is configured to control a throttle opening of the second expansion valve.

The controller is configured to switch between a second evaporator priority mode and a first evaporator priority mode. During the second evaporator priority mode, the controller controls the throttle opening of the second expansion valve based on a refrigerant state in the second evaporator. During the first evaporator priority mode, the controller controls the throttle opening of the second expansion valve based on at least one of a temperature of the first evaporator, a temperature of the refrigerant flowing through the first evaporator, and a temperature of the air having exchanged heat in the first evaporator.

The controller is configured to switch the second evaporator priority mode to the first evaporator priority mode when the at least one of the temperature of the first evaporator, the temperature of the refrigerant flowing through the first evaporator, and the temperature of the air having exchanged heat in the first evaporator is equal to or higher than a switching temperature during the second evaporator priority mode.

During the second evaporator priority mode, the battery-cooling capacity of the second evaporator is preferentially exhibited. During the first evaporator priority mode, the air-cooling capacity of the first evaporator is preferentially exhibited.

The controller switches the second evaporator priority mode to the first evaporator priority mode when the at least one of the temperature of the refrigerant flowing through the first evaporator and the temperature of the air having exchanged heat in the first evaporator is equal to or higher than the switching temperature during the second evaporator priority mode. Thus, when the air-cooling capacity is decreased during the second evaporator priority mode, the second evaporator priority mode is switched to the first evaporator priority mode to secure the air-cooling capacity prior to the battery-cooling capacity.

Hereinafter, embodiments for implementing the present disclosure will be described referring to drawings. In the respective embodiments, parts corresponding to matters already described in the preceding embodiments are given reference numbers identical to reference numbers of the matters already described. The same description is therefore omitted depending on circumstances. In the case where only a part of the configuration is described in each embodiment, the other embodiments described above can be applied to the other part of the configuration. The present disclosure is not limited to combinations of embodiments which combine parts that are explicitly described as being combinable. As long as no problem is present, the various embodiments may be partially combined with each other even if not explicitly described.

First Embodiment

Hereinafter, embodiments will be described with reference to the drawings. A refrigeration cycle device 10 shown in FIG. 1 is a refrigeration cycle device for a vehicle. The refrigeration cycle device 10 is applied for a hybrid vehicle configured to acquire a driving force from an engine 1 (i.e., an internal combustion engine) and an electric motor for traveling.

The hybrid vehicle in this embodiment is configured as a so-called plug-in hybrid vehicle. Thus, the hybrid vehicle in this embodiment is configured to charge a battery 2 mounted in the vehicle using electricity supplied from an external power source (e.g., commercial power source) when the vehicle is stopped. For example, the battery may be a lithium ion battery.

In the hybrid vehicle, the driving force transmitted from the engine 1 is used not only for driving the vehicle but also for operating a power generator. The hybrid vehicle can charge the battery 2 using both electricity generated by the power generator and electricity supplied from the external power supply. The electricity stored in the battery 2 is supplied not only for the electric motor for traveling but also for various in-vehicle devices mounted in the hybrid vehicle.

The hybrid vehicle travels in an EV running mode when a state of charge of the battery 2 is equal to or greater than a predetermined standard state of charge for traveling, such as when the vehicle starts running. During the EV running mode, the vehicle travels by the electric motor for travelling driven by the electricity of the battery 2.

The hybrid vehicle travels in a HV running mode when the state of charge of the battery 2 is lower than the standard state of charge during the vehicle travelling. During the HV running mode, the vehicle is driven mainly by the driving force transmitted from the engine 1. However, when a vehicle travelling load becomes high, the electric motor for vehicle travelling is operated to assist the engine 1.

The hybrid vehicle switches between the EV running mode and the HV running mode as described above. Thus, the hybrid vehicle reduces a fuel consumption of the engine 1 and improves fuel efficiency as compared with a normal vehicle which obtains a driving force for vehicle travelling only from an engine 1.

Figure 2:
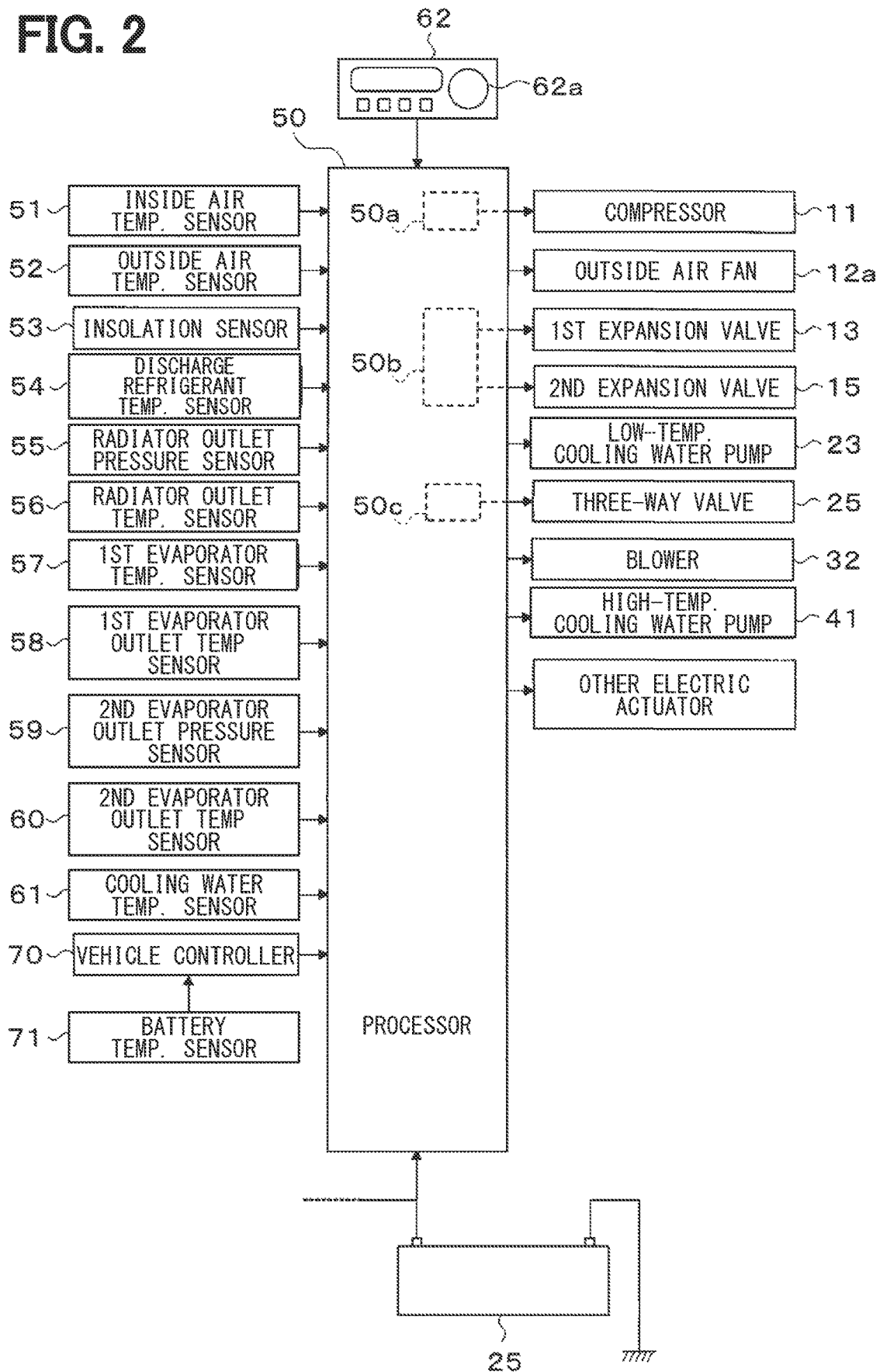
FIG. 2 is a block diagram of an electric control system of the refrigeration cycle device in the first embodiment.

Further, the switching of the hybrid vehicle between the EV running mode and the HV running mode is controlled by a vehicle controller 70 shown in FIG. 2. The engine 1 is a power unit in the hybrid vehicle.

The refrigeration cycle device 10 is configured to cool an air to be blown into the vehicle cabin to cool or dehumidify an air in the vehicle cabin. That is, the refrigeration cycle device 10 serves as an air-cooling device for a vehicle.

The battery 2 which is a secondary battery is preferably used within an appropriate temperature range in order to make full use of a charging and discharging capacity of the battery 2 without promoting deterioration. Therefore, the refrigeration cycle device 10 has a function of cooling the battery 2 so as to maintain a temperature of the battery 2 within the appropriate temperature range. That is, the refrigeration cycle device 10 also serves as a battery-cooling device for a vehicle.

The refrigeration cycle device 10 cools the air to be blown into the vehicle cabin and the battery 2 with a vapor compression type refrigeration cycle.

The refrigeration cycle device 10 is configured to switch a refrigerant circuit between one for an air-cooling single operation, one for a battery-cooling single operation, and one for an air battery cooling operation to perform both the air-cooling and the battery-cooling.

During the air-cooling single operation, the air-cooling is performed and the battery-cooling is not performed. During the battery-cooling single operation, the air-cooling is not performed and the battery-cooling is performed. During the air battery cooling operation, both the air-cooling and the battery-cooling are performed.

In FIG. 1, a flow of a refrigerant in the refrigerant circuit for the air-cooling single operation is indicated by white arrows. A flow of the refrigerant in the refrigerant circuit for the battery-cooling single operation is indicated by hatched arrows. A flow of the refrigerant in the refrigerant circuit for the air battery cooling operation is indicated by black arrows.

The refrigeration cycle device 10 employs a HFC refrigerant (specifically, R1234yf) as the refrigerant and constitutes a vapor compression subcritical refrigeration cycle in which a pressure of the refrigerant discharged from a compressor 11 does not exceed a critical pressure of the refrigerant. The refrigerant is mixed with refrigerant oil serving as a lubricant oil of a compressor 11 and a part of the refrigerant oil circulates through the cycle together with the refrigerant.

The refrigeration cycle device 10 includes the compressor 11, a radiator 12, a first expansion valve 13, a first evaporator 14, a second expansion valve 15, and a second evaporator 16.

The compressor 11 draws, compresses, and discharges the refrigerant in the refrigeration cycle device 10. The compressor 11 is configured as an electric compressor that rotationally drives, by an electric motor, a fixed capacity compression mechanism having a fixed discharge capacity.

A refrigerant discharge capacity (i.e., a rotational speed) of the compressor 11 is controlled by controlling signals transmitted from a controller 50. The compressor 11 is disposed in a vehicle engine hood.

A discharge port of the compressor 11 is fluidly connected to a refrigerant inlet end of the radiator 12. The radiator 12 is an outside heat exchanger that exchanges heat between a high-pressure refrigerant discharged from the compressor 11 and an air outside of the vehicle cabin (hereinafter, referred to as an outside air) that is blown by an outside air fan 12a shown in FIG. 2 to condense the high-pressure refrigerant. The radiator 12 is disposed in a front side of the vehicle engine hood.

The outside air fan 12a is constituted by an electric blower. A ventilation capacity (i.e., a rotational speed) of the outside air fan 12a is controlled by controlling voltage output from the controller 50.

The radiator 12 has a refrigerant outlet end that is fluidly connected to an inlet port of a first three-way joint 17. The first three-way joint 17 includes three ports that are in communication with each other. For example, the first three-way joint 17 is formed by joining multiple pipes. The first three-way joint 17 may be formed by defining multiple refrigerant passages in a metal block or resin block.

One of outlet ports of the first three-way joint 17 is fluidly connected to an inlet end of the first expansion valve 13. The other one of the outlet ports of the first three-way joint 17 is fluidly connected to an inlet end of the second expansion valve 15.

The first expansion valve 13 is a first decompression portion configured to decompress the high-pressure refrigerant flowing out of the radiator 12 during the air-cooling single operation or the air battery cooling operation. The first expansion valve 13 is an electric variable throttle mechanism that includes a valve element and an electric actuator. The valve element is changeable in throttle opening and the electric actuator changes the throttle opening of the valve element. The first expansion valve 13 is configured to adjust a decompression amount of the refrigerant by adjusting an opening area of a refrigerant through which the refrigerant flows.

The basic configuration of the second expansion valve 15 is similar to that of the first expansion valve 13. The first expansion valve 13 and the second expansion valve 15 have a full-opening function in which each of the valves 13 and 15 serves as just a refrigerant passage almost without decompressing the refrigerant by fully opening the opening degree of the valve 13, 15. The first expansion valve 13 and the second expansion valve 15 also have a full-closing function to close the refrigerant passages by fully closing the throttle opening.

The first expansion valve 13 and the second expansion valve 15 can switch the refrigerant circuits for the above-described operations with the fully-opening function and the fully-closing function. Therefore, the first expansion valve 13 and the second expansion valve 15 serve as a refrigerant circuit switching device. The first expansion valve 13 and the second expansion valve 15 are controlled by controlling signals (i.e., controlling pulse) transmitted from the controller 50.

The first expansion valve 13 has an outlet end fluidly connected to a refrigerant inlet end of the first evaporator 14. The first evaporator 14 is disposed in an air-conditioner case 31 of an inside air-conditioning unit 30.

The first evaporator 14 is an air-cooler. The first evaporator 14 is configured to exchange heat between a low-pressure refrigerant having been decompressed by the first expansion valve 13 and an air blown by a blower 32 to evaporate the low-pressure refrigerant during the air-cooling single operation or the air battery cooling operation. That is, the low-pressure refrigerant exhibits a heat absorbing action in the first evaporator 14 and cools air during the air-cooling single operation or the air battery cooling operation.

The first evaporator 14 has an outlet end connected to one of inlets of a second three-way joint 19. The basic configuration of the second three-way joint 19 is similar to that of the first three-way joint 17. The other of the inlets of the second three-way joint 19 is fluidly connected to an outlet end of the second evaporator 16. The second three-way joint 19 has an outlet fluidly connected to a drawing port of the compressor 11.

The second expansion valve 15 has an outlet end fluidly connected to a refrigerant inlet end of the second evaporator 16. The second evaporator 16 is an evaporator in which the low-pressure refrigerant flowing out of the second expansion valve 15 absorbs heat from a cooling water of a low-temperature cooling water circuit 20 to evaporate. The refrigerant outlet end of the second evaporator 16 is fluidly connected the other inlet of the second three-way joint 19.

The low-temperature cooling water circuit 20 is a heat medium circuit through which a heat medium circulates between the second evaporator 16 of the refrigeration cycle device 10, a battery heat exchanger 21, and a radiator 22. Cooling water is used as the heat medium in the low-temperature cooling water circuit 20. The cooling water may be a water or an ethylene glycol aqueous solution.

The low-temperature cooling water circuit 20 includes a low-temperature cooling water pump 23, the second evaporator 16, the battery heat exchanger 21, and the radiator 22. These constituent devices are connected with a cooling water passage in the low-temperature cooling water circuit 20. The low-temperature cooling water circuit 20 constitutes a closed circuit through which the cooling water can circulate.

The low-temperature cooling water pump 23 is a water pump configured to draw and pump the cooling water. The battery heat exchanger 21 is a heat exchanger configured to cool the battery 2 by allowing the cooling water in the low-temperature cooling water circuit 20 to absorb heat from the battery 2. The radiator 22 is a heat exchanger configured to exchange heat between the cooling water in the low-temperature cooling water circuit 20 and the outside air and dissipate heat of the cooling water in the low-temperature cooling water circuit 20. The radiator 22 is disposed at a front side of the vehicle engine hood. The outside air is blown to the radiator 22 by the outside air fan 12a.

The low-temperature cooling water circuit 20 includes a bypass passage 24 and a three-way valve 25. The bypass passage 24 is a cooling water passage through which the cooling water flows in parallel with the radiator 22. The three-way valve 25 is an electromagnetic valve that switches between a state where the cooling water flows through the radiator 22 without flowing through the bypass passage 24 and a state where the cooling water flows through the bypass passage 24 without flowing through the radiator 22. An operation of the three-way valve 25 is controlled by the controller 50.

The refrigeration cycle device 10 includes a receiver (not shown) or an accumulator (not shown). The receiver stores the refrigerant that has released its heat and been condensed in the radiator 12. The accumulator is a gas-liquid separator that separates a gas and liquid phase refrigerant flowing out of the first evaporator 14 and the second evaporator 16 and stores an excess amount of the liquid phase of the refrigerant in the cycle.

The inside air-conditioning unit 30 is configured to send an air into the vehicle cabin. The inside air-conditioning unit 30 is configured to blow an air that is temperature-conditioned by the refrigeration cycle device 10 into the vehicle cabin. The inside air-conditioning unit 30 is disposed inside an instrument panel that is located in a foremost portion of the vehicle cabin.

The inside air-conditioning unit 30 is configured with the air-conditioner case 31, the blower 32, the first evaporator 14, and a heater core 33. The air-conditioner case 31 forms an outer frame of the inside air-conditioning unit 30 and houses the blower 32, the first evaporator 14, and the heater core 33. That is, the first evaporator 14, the heater core 33, and the like are disposed in an air passage defined in the air-conditioner case 31 of the inside air-conditioning unit 30.

The air-conditioner case 31 defines the air passage for air blown into the vehicle cabin. The air conditioner case 31 is formed of a resin (for example, polypropylene) having a certain degree of elasticity and also excellent in strength.

An inside-outside air switching device 34 is disposed in a most upstream side of the air-conditioner case 31 in an airflow direction. The inside-outside air switching device 34 selectively introduces an inside air (that is, air inside the vehicle cabin) and an outside air (that is, air outside the vehicle cabin) into the air conditioner case 31.

The inside-outside air switching device 34 continuously adjusts, with a inside-outside air switching door, both an opening area of an inside air introducing port through which the inside air is introduced into the air conditioner case 31 and an opening area of an outside air introducing port through which the outside air is introduced into the air conditioner case 31. Thereby, the inside-outside air switching device 34 changes an introducing volume ratio between the inside air and the outside air. The inside-outside air switching door is driven by an electric actuator for the inside-outside air switching door. An operation of the electric actuator is controlled by controlling signals transmitted from the controller 50.

The blower 32 is disposed at a position downstream of the inside-outside air switching device 34 in the airflow direction. The blower 32 is constituted by an electric blower that drives a centrifugal multi-blade fan with an electric motor. The blower 32 blows air drawn through the inside-outside air switching device 34 toward the vehicle cabin. A ventilation capacity (i.e., a rotational speed) of the blower 32 is controlled by controlling voltage output from the controller 50.

The first evaporator 14 and the heater core 33 are disposed in this order at a position downstream of the blower 32 in the airflow direction. That is, the first evaporator 14 is disposed at a position upstream of the heater core 33 in the airflow direction.

The heater core 33 is a heating heat exchanger that heats the air by exchanging heat between the cooling water circulating through the high-temperature cooling water circuit 40 and the air having passed through the first evaporator 14.

An air mix door 35 is disposed at a position downstream of the first evaporator 14 in the air-conditioner case 31 and upstream of the heater core 33 in the airflow direction.

The air mix door 35 is an air volume ratio adjusting portion that is configured to adjust a volume ratio between an air flowing through the heater core 33 and an air bypasses the heater core 33 to the air having passed through the first evaporator 14.

The air mix door 35 is driven by an electric actuator for the air mix door 35. An operation of the electric actuator is controlled by controlling signals transmitted from the controller 50.

A mixing space is defined in a position downstream of the heater core 33. The mixing space is a space where a warm air that has passed through the heater core 33 and a cool air that has bypassed the heater core 33 are mixed.

In a downstream portion of the air-conditioner case 31 in the airflow direction, opening portions through which the air mixed in the mixing space (i.e., the conditioned air) is blown out toward the vehicle cabin.

The opening portions include a face opening portion, a foot opening portion, and a defroster opening portion (any of them are not shown). The face opening portion is an opening portion for supplying the conditioned air toward the upper body of a passenger in the vehicle cabin. The foot opening portion is an opening portion for supplying the conditioned air toward the feet of the passenger. The defroster opening portion is an opening portion for supplying the conditioned air toward an inner surface of a windshield of the vehicle cabin.

The face opening portion, the foot opening portion, and the defroster opening portion are respectively connected to a face blowing outlet, a foot blowing outlet, and a defroster blowing outlet (any of them are not shown) through a duct forming the air passage.

The air mix door 35 adjusts the air volume ratio between the air passing through the heater core 33 and the air bypasses the heater core 33, so that the temperature of the conditioned air mixed in the mixing space is adjusted. According to this, the temperature of the air (i.e., the temperature of the conditioned air) blown into the vehicle cabin through the blowing outlets is adjusted.

A face door, a foot door, and a defroster door are respectively disposed in positions upstream of the face opening portion, the foot opening portion, and the defroster opening portion. The face door adjusts an opening area of the face opening portion. The foot door adjusts an opening area of the foot opening portion. The defroster door adjusts an opening area of the defroster opening portion.

The face door, the foot door, and the defroster door serve as a blowing outlet mode switching device that switches the blowing outlet modes. These doors are connected to an electric actuator for driving the blowing outlet mode doors through a link mechanism or the like and are rotationally operated in conjunction with the electric actuator. An operation of the electric actuator is controlled by controlling signals transmitted from the controller 50.

The blowing outlet modes that is switched by the blowing outlet mode switching device specifically include a face mode, a bi-level mode, a foot mode, and the like.

The face mode is a blowing outlet mode in which the face blowing outlet is fully opened to blow out air therefrom toward the upper body of the passenger in the vehicle cabin. The bi-level mode is a blowing outlet mode in which both the face blowing outlet and the foot blowing outlet are opened to blow out air therefrom toward the upper body and the feet of the passenger in the vehicle cabin. The foot mode is a blowing outlet mode in which the foot blowing outlet is fully opened and the defroster blowing outlet is slightly opened so that the air is blown mainly through the foot blowing outlet.

The passenger can manually set the defroster mode by manually operating a blowing mode switch provided on an operation panel 62 shown in FIG. 2. The defroster mode is a blowing outlet mode in which the defroster blowing outlet is fully opened so that air is blown toward the inner surface of the windshield of the vehicle through the defroster blowing outlet.

The high-temperature cooling water circuit 40 is a heat medium circuit through which the heat medium circulates between the engine 1 and the heater core 33. The heat medium in the high-temperature cooling water circuit 40 is, for example, a cooling water. The cooling water may be a water or an ethylene glycol aqueous solution.

The high-temperature cooling water circuit 40 includes a high-temperature cooling water pump 41, the engine 1, and the heater core 33. In the high-temperature cooling water circuit 40, these constituent devices are connected with a cooling water passage. The high-temperature cooling water circuit 40 constitutes a closed circuit through which the cooling water can circulate.

The high-temperature cooling water pump 41 is a water pump that draws and pumps the cooling water. The cooling water in the high-temperature cooling water circuit 40 circulates through the engine 1, so that the engine 1 is cooled and the cooling water in the high-temperature cooling water circuit 40 is heated. The heater core 33 is configured to heat the air by exchanging heat between the cooling water heated in the engine 1 and the air having passed through the first evaporator 14 in the inside air-conditioning unit 30.

For example, in a vehicle that does not have an engine such as an electric vehicle, the high-temperature cooling water circuit 40 may include a water heating heater in place of the engine 1. The water heating heater includes, for example, a PTC element or a nichrome wire and heats the cooling water by generating heat when being supplied with electricity.

Next, an electric controlling system in the refrigeration cycle device 10 will be described. As shown in FIG. 2, the refrigeration cycle device 10 includes the controller 50. The controller 50 includes a known microcomputer including CPU, ROM, RAM and the like, and peripheral circuits. For example, the controller 50 corresponds to a processor.

The controller 50 performs calculations and processing based on air-conditioning controlling programs stored in the ROM to control various controlled devices connected to an output side of the controller 50. The controlled devices include the compressor 11, the outside air fan 12a, the first expansion valve 13, the second expansion valve 15, the low-temperature cooling water pump 23, the three-way valve 25, the blower 32, the high-temperature cooling water pump 41, and the like.

Various air-conditioning sensors for controlling an operation of the refrigeration cycle device 10 are connected to an input side of the controller 50. Detecting signals of these air-conditioning sensors are input into the controller 50.

As shown in FIG. 2, the air-conditioning sensors include an inside air temperature sensor 51, an outside air temperature sensor 52, an insolation sensor 53, a discharge refrigerant temperature sensor 54, a radiator outlet pressure sensor 55, a radiator outlet temperature sensor 56, a first evaporator temperature sensor 57, a first evaporator outlet temperature sensor 58, a second evaporator outlet pressure sensor 59, a second evaporator outlet temperature sensor 60, a cooling water temperature sensor 61, and the like.

The inside air temperature sensor 51 is an inside air temperature detector that detects a temperature Tr in the vehicle cabin (hereinafter, referred to as an inside air temperature). The outside air temperature sensor 52 is an outside air temperature detector that detects a temperature Tam outside of the vehicle cabin (hereinafter, referred to as an outside air temperature). The insolation sensor 53 is an insolation amount detector that detects an insolation amount As entering into the vehicle cabin.

The discharge refrigerant temperature sensor 54 is a discharge refrigerant temperature detector that detects a temperature of the refrigerant discharged from the compressor 11. The radiator outlet pressure sensor 55 is a radiator outlet pressure detector that detects a pressure of the refrigerant flowing out of the radiator 12. The radiator outlet temperature sensor 56 is a radiator outlet temperature detector that detects a temperature T3 of the refrigerant flowing out of the radiator 12.

The first evaporator temperature sensor 57 is an evaporator temperature detector that detects an evaporating temperature TE of the refrigerant in the first evaporator 14 (hereinafter, referred to as a temperature TE of the first evaporator 14). For example, the first evaporator temperature sensor 57 detects a temperature of fins of the first evaporator 14.

The first evaporator outlet temperature sensor 58 is a first evaporator outlet temperature detector that detects a temperature of the refrigerant flowing out of the first evaporator 14.

The second evaporator outlet pressure sensor 59 is a second evaporator outlet pressure detector that detects a pressure of the refrigerant flowing out of the second evaporator 16. The second evaporator outlet temperature sensor 60 is a second evaporator outlet temperature detector that detects a temperature of the refrigerant flowing out of the second evaporator 16.

The cooling water temperature sensor 61 is a cooling water temperature detector that detects the cooling water flowing into the battery heat exchanger 21.

Figure 3:
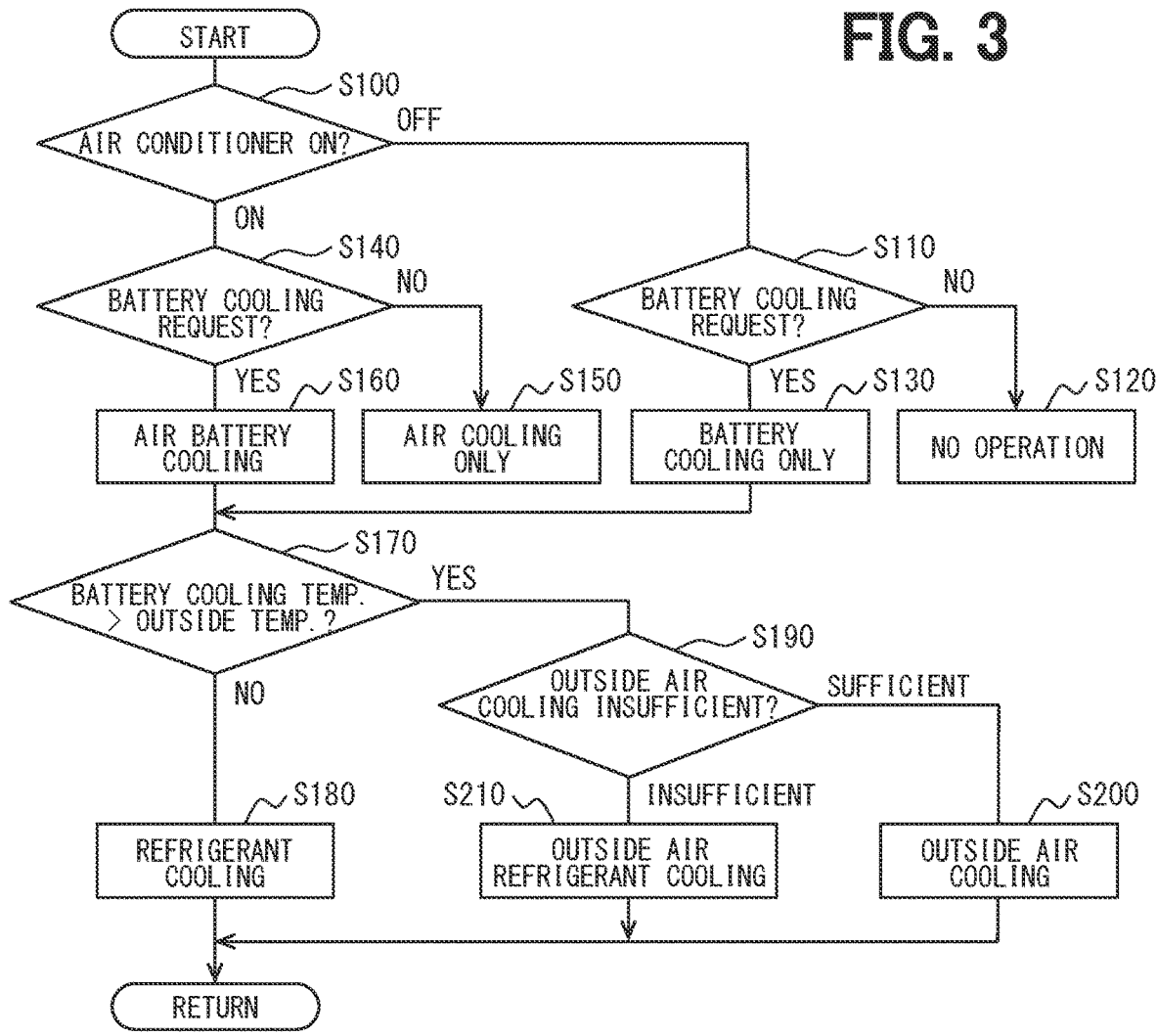
FIG. 3 is a flowchart illustrating a first controlling process executed by a controller of the refrigeration cycle device in the first embodiment.

As shown in FIG. 3, the operation panel 62 is connected to the input side of the controller 50. The operation panel 62 is disposed in a vicinity of the instrument panel that is located in the forefront portion of the vehicle cabin and includes various operation switches. Thus, operation signals from the various operation switches are input into the controller 50.

The various operation switches of the operation panel 62 include a temperature setting switch 62a, an auto switch, an air-conditioning switch, an air volume setting switch, a blowing mode switch, and the like.

The temperature setting switch 62a is operated when setting a target temperature Tset in the vehicle cabin. The auto switch is operated when starting and terminating an automatic control operation of the refrigeration cycle device 10.

The air-conditioning switch is operated when requesting to cool the air supplied into the vehicle cabin from the refrigeration cycle device 10. The air volume setting switch is operated when manually setting an air volume of the blower 32. The blowing mode switch is operated when manually setting the blowing mode in the refrigeration cycle device 10.

The vehicle controller 70 is connected to an input side of the controller 50. As described above, the vehicle controller 70 performs switching control between the EV running mode and the HV running mode in the hybrid vehicle. Thus, running mode signals that indicate a running mode of the hybrid vehicle (i.e., the HV running mode or the EV running mode) is input into the controller 50.

The vehicle controller 70 determines whether the battery 2 needs to be cooled or not based on the temperature of the battery 2 detected by a battery temperature sensor 71 and transmits the determining results to the controller 50. Thus, signals that indicate whether the battery 2 needs to be cooled or not are input into the controller 50.

The vehicle controller 70 also transmits the temperature of the battery 2 detected by the battery temperature sensor 71 to the controller 50. Thus, the temperature of the battery 2 detected by the battery temperature sensor 71 is also input into the controller 50.

The controller 50 is integrally configured with controlling units that are configured to control various controlled devices connected to the output side of the controller 50. Each of the controlling units of the controller 50 includes a configuration (i.e., hardware and software) to control each controlled device.

For example, the controller 50 includes a compressor controlling unit 50a, a throttle controlling unit 50b, and a three-way valve controlling unit 50c. The compressor controlling unit 50a is a configuration of the controller 50 to control the compressor 11. The throttle controlling unit 50b is a configuration of the controller 50 to control the first expansion valve 13 and the second expansion valve 15. The three-way valve controlling unit 50c is a configuration of the controller 50 to control the three-way valve 25.

Next, operation modes of the refrigeration cycle device 10 will be described. As described above, the refrigeration cycle device 10 can cool both the air blown into the vehicle cabin and the battery 2.

The refrigeration cycle device 10 switches between the air-cooling single operation, the battery-cooling single operation, and the air battery cooling operation for cooling both the air blown into the vehicle cabin and the battery 2.

Switching of the operation modes in the refrigeration cycle device 10 is performed by executing the controlling programs. The controlling programs are executed when an ignition switch of the vehicle is turned on.

During the air-cooling single operation, the first expansion valve 13 is opened at a predetermined throttle opening and the second expansion valve 15 is closed. As a result, the refrigerant flows as shown in the white arrows in FIG. 1. That is, the refrigerant decompressed by the first expansion valve 13 flows through the first evaporator 14 and the refrigerant does not flow through the second evaporator 16. Thus, the refrigeration cycle device 10 cools the air to be blown into the vehicle cabin but does not cool the battery 2.

During the battery-cooling single operation, the first expansion valve 13 is closed and the second expansion valve 15 is opened at a predetermined throttle opening. Further, the low-temperature cooling water pump 23 is operated. As a result, the refrigerant flows as shown in the hatched arrows in FIG. 1. That is, the refrigerant does not flow through the first evaporator 14 and the refrigerant decompressed by the second expansion valve 15 flows through the second evaporator 16. Thus, the refrigeration cycle device 10 does not cool the air but cools the battery 2.

During the air battery cooling operation, the first expansion valve 13 is opened at a predetermined throttle opening and the second expansion valve 15 is opened at a predetermined throttle opening. Further, the low-temperature cooling water pump 23 is operated. As a result, the refrigerant flows as shown in the black arrows shown in FIG. 1. That is, the refrigerant decompressed by the first expansion valve 13 flows through the first evaporator 14 and the refrigerant decompressed by the second expansion valve 15 flows through the second evaporator 16. Thus, the refrigeration cycle device 10 cools both the air sent into the vehicle cabin and the battery 2.

During the air-cooling single operation and the air battery cooling operation, the air-conditioning controlling program is executed. More specifically, in a main routine of the air-conditioning controlling program, detecting signals of the above-described sensors for air-conditioning and operation signals from the various air-conditioning operation switches are read. Then, based on the read values of the detecting signals and the operation signals, a target blowing temperature TAO which is a target temperature of the air to be blown into the vehicle cabin is calculated according to the following formula F1.

$$TAO = Kset \times Tset - Kr \times Tr - Kam \times Tam - Ks \times As + C \quad (F1)$$

In the formula F1, Tset is a target temperature in the vehicle cabin (in other words, a setting temperature in the vehicle cabin) set with the temperature setting switch 62a. In the formula F1, Tr is an inside air temperature detected by the inside air temperature sensor 51. In the formula F1, Tam is an outside air temperature detected by the outside air temperature sensor 52. In the formula F1, As is an insolation amount detected by the insolation sensor 53. In the formula F1, Kset, Kam, and Ks are controlling gains and C is a constant for correction.

During the air-cooling single operation and the air battery cooling operation, the controller 50 controls the first expansion valve 13 to be in a throttled state where the first expansion valve 13 exerts a decompressing action and the second expansion valve 15 to be in a fully-closed state.

Thus, the refrigeration cycle device 10 in the cooling operations constitutes a vapor compression type refrigeration cycle in which the refrigerant circulates through the compressor 11, the radiator 12, the first expansion valve 13, the first evaporator 14, and the compressor 11 in this order as shown in the white arrows in FIG. 1.

In this cycle configuration, the controller 50 determines a refrigerant discharge capacity of the compressor 11 (i.e., controlling signals transmitted to the electric motor of the compressor 11). Specifically, the controller 50 controls the compressor 11 such that the temperature TE of the first evaporator 14 becomes the target evaporator temperature TEO.

The target evaporator temperature TEO is determined, based on the target blowing temperature TAO, with reference to the controlling map stored in the controller 50 in advance. In the controlling map, the target evaporator temperature TEO is determined such that the target evaporator temperature TEO decreases as the target blowing temperature TAO decreases. The target evaporator temperature TEO is determined within a range (specifically, a range that is higher than 1° C.) to prevent the first evaporator 14 from being covered with frosts.

As described above, the refrigeration cycle device 10 includes a receiver (not shown) or an accumulator (not shown).

When the refrigeration cycle device 10 includes the receiver, the controller 50 adjusts the throttle opening of the first expansion valve 13 such that a superheat degree of the refrigerant flowing out of the first evaporator 14 becomes a target superheat degree. The target superheat degree is determined, based on a pressure of the refrigerant flowing out of the first evaporator 14 and a temperature of the refrigerant flowing out of the first evaporator 14, with reference to the controlling map stored in the controller 50 in advance. In the controlling map, the target superheat degree is determined such that a coefficient of performance COP in this cycle reaches a local maximum value.

When the refrigeration cycle device 10 includes the receiver, the first expansion valve 13 may be a thermal expansion valve.

When the refrigeration cycle device 10 includes the accumulator, the controller 50 adjusts the throttle opening of the first expansion valve 13 such that a subcooling degree of the refrigerant flowing into the first expansion valve 13 becomes a target subcooling degree. The target subcooling degree is determined, based on the pressure of the refrigerant flowing out of the radiator 12 and the temperature of the refrigerant flowing out of the radiator 12, with reference to the controlling map stored in the controller 50 in advance. In the controlling map, the target subcooling degree is determined such that the coefficient of performance COP of the cycle reaches a local maximum value.

As described above, during the air-cooling single operation and the air battery cooling operation, the heat of the refrigerant absorbed from the air when the refrigerant evaporates in the first evaporator 14 is dissipated to the outside air in the radiator 12. Thereby, the air is cooled in the first evaporator 14.

A controlling process executed by the controller 50 will be described based on a flowchart shown in FIG. 3. In step S100, it is determined whether the air-conditioning switch of the operation panel 62 is turned on or not.

When it is determined that the air-conditioning switch is not turned on in step S100, the process proceeds to step S110 and it is determined whether there is a battery cooling request from a battery controller 75 or not.

When it is determined that there is no battery cooling request from the battery controller 75 in step S110, both the air-cooling and the battery-cooling are not needed. Thus, the process proceeds to step S120 and the refrigeration cycle device 10 is not operated. Specifically, the compressor 11 is stopped.

In contrast, when it is determined that there is the battery cooling request from the battery controller 75 in step S110, the air-cooling is not needed and the battery-cooling is needed. Thus, the process proceeds to step S130 and the controller 50 determines to perform the battery-cooling single operation.

When it is determined to perform the battery-cooling single operation in step S130, the process proceeds to step S170 and it is determined whether the temperature of the cooling water for the battery 2 is greater than the outside air temperature or not. When it is determined that the temperature of the cooling water for the battery 2 is not greater than the outside air temperature in step S170, the cooling water for the battery 2 cannot be cooled with the outside air. Thus, the cooling water for the battery 2 needs to be cooled in the second evaporator 16, so that the process proceeds to step S180 and the cooling water is cooled with the refrigerant.

Specifically, the controller 50 operates the refrigeration cycle device 10, closes the first expansion valve 13 to prevent the refrigerant from flowing through the first evaporator 14, and opens the second expansion valve 15 at a predetermined throttle opening to flow the refrigerant through the second evaporator 16. Further, the controller 50 operates the low-temperature cooling water pump 23 and controls the three-way valve 25 to circulate the cooling water between the second evaporator 16 and the battery heat exchanger 21. As a result, the air-cooling is not performed in the first evaporator 14 and the cooling water for the battery 2 is cooled in the second evaporator 16. Thus, the battery 2 is cooled without performing the air-cooling.

In contrast, when it is determined that the temperature of the cooling water for the battery 2 is greater than the outside air temperature in step S170, the process proceeds to step S190 and it is determined whether a battery cooling amount is insufficient or not while the cooling water is cooled in the radiator 22 with the outside air.

For example, when the temperature of the battery 2 or the temperature of the cooling water in the low-temperature cooling water circuit 20 tends to increase while the cooling water is cooled in the radiator 22 with the outside air, it is determined that the battery cooling amount is insufficient.

When it is determined that the battery cooling water is not insufficient while the cooling water is cooled in the radiator 22 with the outside air in step S190, the process proceeds to step S200 and the cooling water is cooled with the outside air.

Specifically, the refrigeration cycle device 10 is not operated and the refrigerant is restricted from flowing through both the first evaporator 14 and the second evaporator 16. Further, the controller 50 operates the low-temperature cooling water pump 23 and controls the three-way valve 25 to circulate the cooling water between the radiator 22 and the battery heat exchanger 21. As a result, the battery cooling water is cooled by the outside air in the radiator 22 without performing air cooling in the first evaporator 14. Thus, the battery 2 is cooled with the outside air without performing the air-cooling.

In contrast, when it is determined that the battery cooling amount is insufficient while the cooing water is cooled with the outside air in the radiator 22 in step S190, the process proceeds to step S210 and the cooling water is cooled with the outside air and the refrigerant.

Specifically, the controller 50 operates the refrigeration cycle device 10, closes the first expansion valve 13 to prevent the refrigerant from flowing through the first evaporator 14, and opens the second expansion valve 15 at a predetermined throttle opening to flow the refrigerant through the second evaporator 16. Further, the controller 50 operates the low-temperature cooling water pump 23 and controls the three-way valve 25 to circulate the cooling water between the second evaporator 16, the radiator 22, and the battery heat exchanger 21.

At this time, a target temperature of the cooling water cooled in the second evaporator 16 is determined such that a cooling water temperature of an inlet side of the radiator 22 is equal to or higher than the outside air temperature. The reason is that the refrigerant is restricted from absorbing heat from the outside air in the radiator 22. The target temperature is calculated based on, for example, the outside air temperature, a flow rate of the cooling water, and an amount of heat generated by the battery 2.

As a result, the cooling water is cooled in both the second evaporator 16 and the radiator 22 without performing the air-cooling in the first evaporator 14. Thus, the battery 2 is cooled with the outside air and the refrigerant without performing the air-cooling.

In contrast, when it is determined that the air-conditioning switch is turned on in step S100, the process proceeds to step S140 and it is determined whether there is the battery cooling request from the battery controller 75 or not.

When it is determined that there is no battery cooling request from the battery controller 75 in step S140, the air-cooling is needed and the battery-cooling is not needed. Thus, the process proceeds to step S150 and the air-cooling single operation is performed by operating the refrigeration cycle device 10.

In contrast, when it is determined that there is the battery cooling request from the battery controller 75 in step S140, both the air-cooling and the battery-cooling are needed. Thus, the process proceeds to step S160 and the air battery cooling operation is performed by operating the refrigeration cycle device 10.

When it is determined to perform the air battery cooling operation in step S160, the process proceeds to step S170 and it is determined whether the battery cooling water is greater than the outside air temperature or not. When it is determined that the temperature of the cooling water for the battery 2 is not greater than the outside air temperature in step S170, the cooling water for the battery 2 cannot be cooled with the outside air. Thus, the cooling water for the battery 2 needs to be cooled in the second evaporator 16, so that the process proceeds to step S180 and the cooling water is cooled with the refrigerant.

Specifically, the controller 50 opens both the first expansion valve 13 and the second expansion valve 15 at respective predetermined throttle openings to flow the refrigerant through both the first evaporator 14 and the second evaporator 16. Further, the controller 50 operates the low-temperature cooling water pump 23 and controls the three-way valve 25 to circulate the cooling water between the second evaporator 16 and the battery heat exchanger 21. As a result, the air is cooled in the first evaporator 14 and the battery cooling water is cooled in the second evaporator 16. Thus, both the air-cooling and the cooling of the battery 2 are performed.

In contrast, when it is determined that the temperature of the cooling water for the battery 2 is greater than the outside air temperature in step S170, the process proceeds to step S190 and it is determined whether a battery cooling amount is insufficient or not while the cooling water is cooled in the radiator 22 with the outside air.

For example, when the temperature of the battery 2 or the temperature of the cooling water in the low-temperature cooling water circuit 20 tends to increase while the cooling water is cooled in the radiator 22 with the outside air, it is determined that the battery cooling amount is insufficient.

When it is determined that the battery cooling amount is not insufficient while the cooling water is cooled in the radiator 22 with the outside air in step S190, the process proceeds to step S200. In step S200, the air-cooling is performed by operating the refrigeration cycle device 10 and the cooling water is cooled with the outside air.

Specifically, the controller 50 opens the first expansion valve 13 at a predetermined throttle opening to flow the refrigerant through the first evaporator 14 and closes the second expansion valve 15 not to flow the refrigerant through the second evaporator 16. Further, the controller 50 operates the low-temperature cooling water pump 23 and controls the three-way valve 25 to circulate the cooling water between the radiator 22 and the battery heat exchanger 21. As a result, the air is cooled in the first evaporator 14 and the cooling water for the battery 2 is cooled in the radiator 22 with the outside air. Thus, the air-cooling is performed and the battery 2 are cooled with the outside air.

In contrast, when it is determined that the battery cooling amount is insufficient while the cooling water is cooled in the radiator 22 with the outside air in step S190, the process proceeds to step S210. In step S210, the air is cooled by operating the refrigeration cycle device 10 and the cooling water is cooled with the outside air and the refrigerant.

Specifically, the controller 50 opens both the first expansion valve 13 and the second expansion valve 15 at respective predetermined throttle openings to flow the refrigerant through both the first evaporator 14 and the second evaporator 16. Further, the controller 50 operates the low-temperature cooling water pump 23 and controls the three-way valve 25 to circulate the cooling water between the second evaporator 16, the radiator 22, and the battery heat exchanger 21.

At this time, a target temperature of the cooling water cooled in the second evaporator 16 is determined such that a cooling water temperature of an inlet side of the radiator 22 is equal to or higher than the outside air temperature. The reason is that the refrigerant is restricted from absorbing heat from the outside air in the radiator 22. The target temperature is calculated based on, for example, the outside air temperature, a flow rate of the cooling water, and an amount of heat generated by the battery 2.

As a result, the air-cooling is performed in the first evaporator 14 and the cooling water is cooled in both the second evaporator 16 and the radiator 22. Thus, the air-cooling is performed and the cooling of the battery 2 with the outside air and the refrigerant is performed.

Figure 4:
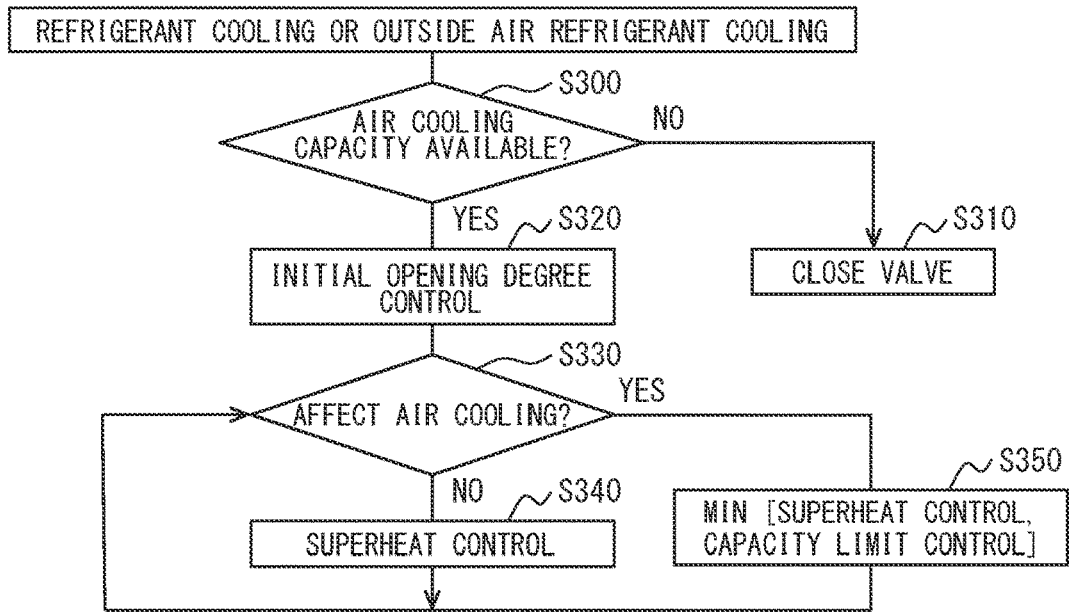
FIG. 4 is a flowchart illustrating a second controlling process executed by the controller of the refrigeration cycle device in the first embodiment.

During the air battery cooling operation, when the cooling water is cooled with the refrigerant in step S180 or when the cooling water is cooled with the outside air and the refrigerant in step S210, a second expansion valve control of steps S300 to S350 shown in FIG. 4 is executed.

In step S300, it is determined whether there is an available capacity for cooling the air or not. Specifically, it is determined whether the temperature TE of the first evaporator 14 is lower than a predetermined evaporator temperature $\alpha$ or not. The predetermined evaporator temperature $\alpha$ is a temperature close to the target evaporator temperature TEO.

When it is determined that there is no available capacity for cooling the air in step S300, the second expansion valve 15 is closed to put priority on the air-cooling over the battery-cooling. As a result, the air-cooling is performed in the first evaporator 14 and the cooling water is not cooled in the second evaporator 16.

In contrast, when it is determined that there is an available capacity for cooling the air in step S300, an initial opening degree control of the second expansion valve 15 is executed.

Specifically, during the initial opening degree control of the second expansion valve 15, an opening degree of the second expansion valve 15 is set to a predetermined initial opening degree. The predetermined initial opening degree is an opening degree of the second expansion valve 15 whose influence on the air-cooling is as small as possible. In other words, the predetermined initial opening degree is an opening degree of the second expansion valve 15 that is smaller than an opening degree whose influence on the air-cooling is large.

As a result, when the refrigerant is started to flow through the second evaporator 16 by opening the second expansion valve 15, the refrigerant flowing through the first evaporator 14 is restricted from being largely reduced. Thus, the heat exchange amount in the first evaporator 14 is restricted from decreasing and the temperature of the air cooled in the first evaporator 14 is restricted from greatly fluctuating.

During the initial opening degree control of the second expansion valve 15, the throttle opening of the second expansion valve 15 may be gradually increased at a predetermined opening rate. The opening rate is an increasing amount of the throttle opening per unit time. The predetermined opening rate is an opening rate of the second expansion valve 15 whose influence on the air-cooling is as small as possible. In other words, the predetermined opening rate is an opening rate that is less than an opening rate of the second expansion valve 15 whose influence on the air-cooling is large.

As a result, when the refrigerant is started to flow through the second evaporator 16 by opening the second expansion valve 15, the refrigerant flowing through the first evaporator 14 is restricted form being largely reduced. Thus, the heat exchange amount in the first evaporator 14 is restricted from decreasing and the temperature of the air cooled in the first evaporator 14 is restricted from greatly fluctuating.

In following step S330, it is determined whether the battery-cooling affects the air-cooling or not. Specifically, it is determined whether a rotational speed NC of the compressor 11 is higher than a predetermined rotational speed NC1 or not and whether a difference TE-TEO calculated by subtracting the target evaporator temperature TEO from the temperature TE of the first evaporator 14 is greater than an acceptable temperature difference ΔTE or not.

Figure 5:
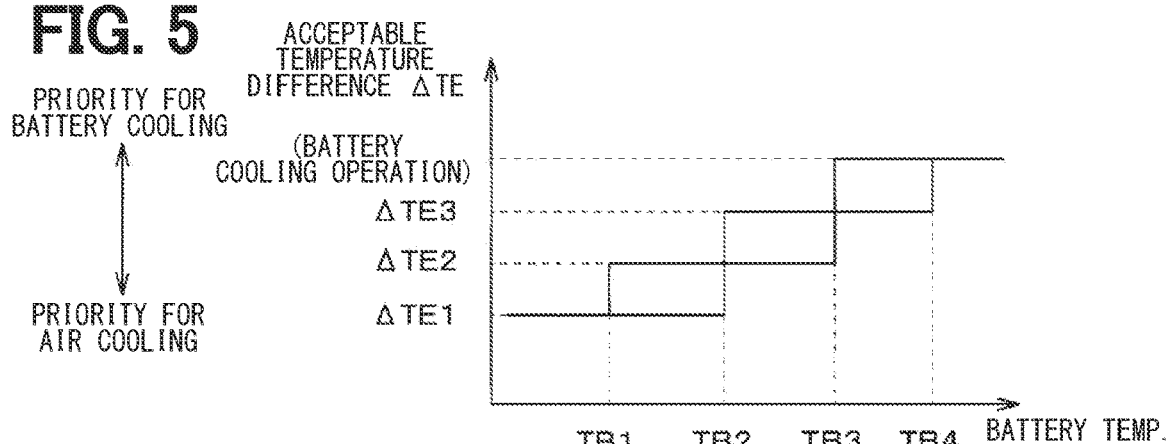
FIG. 5 is a controlling characteristic diagram for calculating a temperature difference in the second controlling process shown in FIG. 4.

As shown in FIG. 5, the acceptable temperature difference ΔTE is calculated based on a level of the battery cooling request (in other words, the temperature of the battery 2).

The higher the temperature of the battery 2 is, the higher the level of the battery cooling request is set. The higher the level of the battery cooling request is, the greater the acceptable temperature difference ΔTE is set. The acceptable temperature difference ΔTE is increased stepwise as the battery cooling request increases. In an emergency when the temperature of the battery 2 becomes extremely high and the level of the battery cooling request becomes very high, the operation mode is shifted to the battery-cooling single operation.

In FIG. 5, the battery temperatures TB1, TB2, TB3, and TB4 satisfy a relationship of TB1<TB2<TB3<TB4. The battery temperature TB1 is a temperature close to a maximum temperature within an adjusted temperature range (e.g., 10 to 40° C.) of the battery 2. For example, when the adjusted temperature range of the battery 2 falls within a range from 10 to 40° C., the battery temperature TB1 is about 40° C. The battery temperature TB4 is a temperature close to an upper limit temperature (e.g., 50° C.) of the battery 2.

In FIG. 5, acceptable temperature differences ΔTE1, ΔTE2, and ΔTE3 satisfy a relationship of ΔTE1<ΔTE2<ΔTE3. The acceptable temperature difference ΔTE1 is, for example, 3° C. The acceptable temperature difference ΔTE3 is, for example, 12° C.

When it is determined that there is no influence on the air-cooling by the battery-cooling in step S330, the process proceeds to step S340 and a superheat degree control for the second expansion valve 15 is executed. Specifically, an increasing amount of the opening degree of the second expansion valve 15 is determined such that a superheat degree of the refrigerant on the outlet side of the second evaporator 16 becomes a predetermined superheat degree and the opening degree of the second expansion valve 15 is controlled based on the determination. That is, the superheat degree control is a second evaporator priority control in which the second expansion valve 15 is controlled such that the cooling capacity of the second evaporator 16 takes priority.

The controller 50 calculates a superheat degree of the refrigerant on the outlet side of the second evaporator 16 based on the pressure and the temperature of the refrigerant on the outlet side of the second evaporator 16. The controller 50 may calculate the superheat degree of the refrigerant on the outlet side of the second evaporator 16 based on a temperature difference between the refrigerant on the inlet side of the second evaporator 16 and the refrigerant in the outlet side of the second evaporator 16.

At this time, the rotational speed of the compressor 11 is controlled such that the temperature TE of the first evaporator 14 becomes the target evaporator temperature TEO.

In contrast, when there is an influence on the air-cooling by the battery-cooling in step S330, the process proceeds to step S350. In step S350, as a changing amount of the opening degree of the second expansion valve 15, a smaller one of a changing amount of the opening degree of the second expansion valve 15 controlled in the superheat degree control and a changing amount of the opening degree of the second expansion valve 15 controlled in a capacity limit control is selected.

During the capacity limit control, the increasing amount of the opening degree of the second expansion valve 15 is determined based on a difference between the temperature TE of the first evaporator 14 and the target evaporator temperature TEO and the opening degree of the second expansion valve 15 is controlled based on the determination. That is, the capacity limit control is a first evaporator priority mode in which the second expansion valve 15 is controlled such that the cooling capacity of the first evaporator 14 takes priority.

Specifically, when a difference between the temperature TE of the first evaporator 14 and the target evaporator temperature difference TEO is zero, an increasing amount of the opening degree of the second expansion valve 15 is set to zero. The smaller the difference between the temperature TE of the first evaporator 14 and the target evaporator temperature TEO is, the greater the increasing amount of the opening degree of the second expansion valve 15 is set. The greater the difference between the temperature TE of the first evaporator 14 and the target evaporator temperature TEO is, the smaller the increasing amount of the opening degree of the second expansion valve 15 is set.

As a result, the increasing amount of the opening degree of the second expansion valve 15 can be determined such that the cooling capacity of the second evaporator 16 is more limited as the difference between the temperature TE of the first evaporator 14 and the target evaporator temperature TEO increases.

Figure 6:
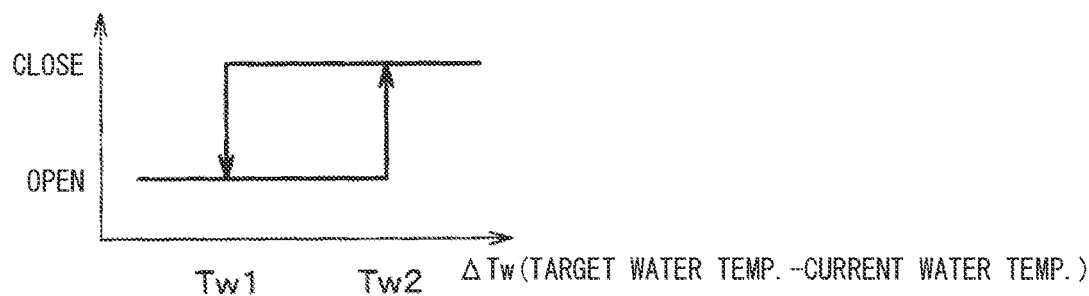
FIG. 6 is a controlling characteristic diagram for switching between opening and closing of a second expansion valve in the second controlling process shown in FIG. 4.

In steps S340 and S350, an opening-closing control of the second expansion valve 15 shown in FIG. 6 is operated. In FIG. 6, a target water temperature is a target temperature of the cooling water in the low-temperature cooling water circuit 20 and a current water temperature is a current temperature of the cooling water in the low-temperature cooling water circuit 20.

That is, the opening-closing control of the second expansion valve 15 is performed based on a difference calculated by subtracting the current temperature of the cooling water in the low-temperature cooling water circuit 20 from the target temperature of the cooling water in the low-temperature cooling water circuit 20.

Specifically, when the difference calculated by subtracting the current temperature of the cooling water in the low-temperature cooling water circuit 20 from the target temperature of the cooling water in the low-temperature cooling water circuit 20 is less than an opening valve value Tw1, the battery 2 needs to be cooled and the second expansion valve 15 is opened. When the difference calculated by subtracting the current temperature of the cooling water in the low-temperature cooling water circuit 20 from the target temperature of the cooling water in the low-temperature cooling water circuit 20 is greater than a closing valve value Tw2, the battery 2 does not need to be cooled and the second expansion valve 15 is closed.

The target temperature of the cooling water in the low-temperature cooling water circuit 20 is predetermined. The closing valve value Tw2 is set to a value greater than the opening valve value Tw1.

When the second expansion valve 15 is closed, the opening degree of the second expansion valve 15 is gradually decreased at a predetermined closing rate to gradually close the second expansion valve 15. The closing rate is a degreasing amount of the throttle opening per unit time.

As a result, when the second expansion valve 15 is closed, the refrigerant flowing into the second expansion valve 15 is restricted from being sharply decreased, the temperature of the first evaporator 14 is restricted from being sharply decreased, and the first evaporator 14 is restricted from being covered with frosts.

Figure 7:
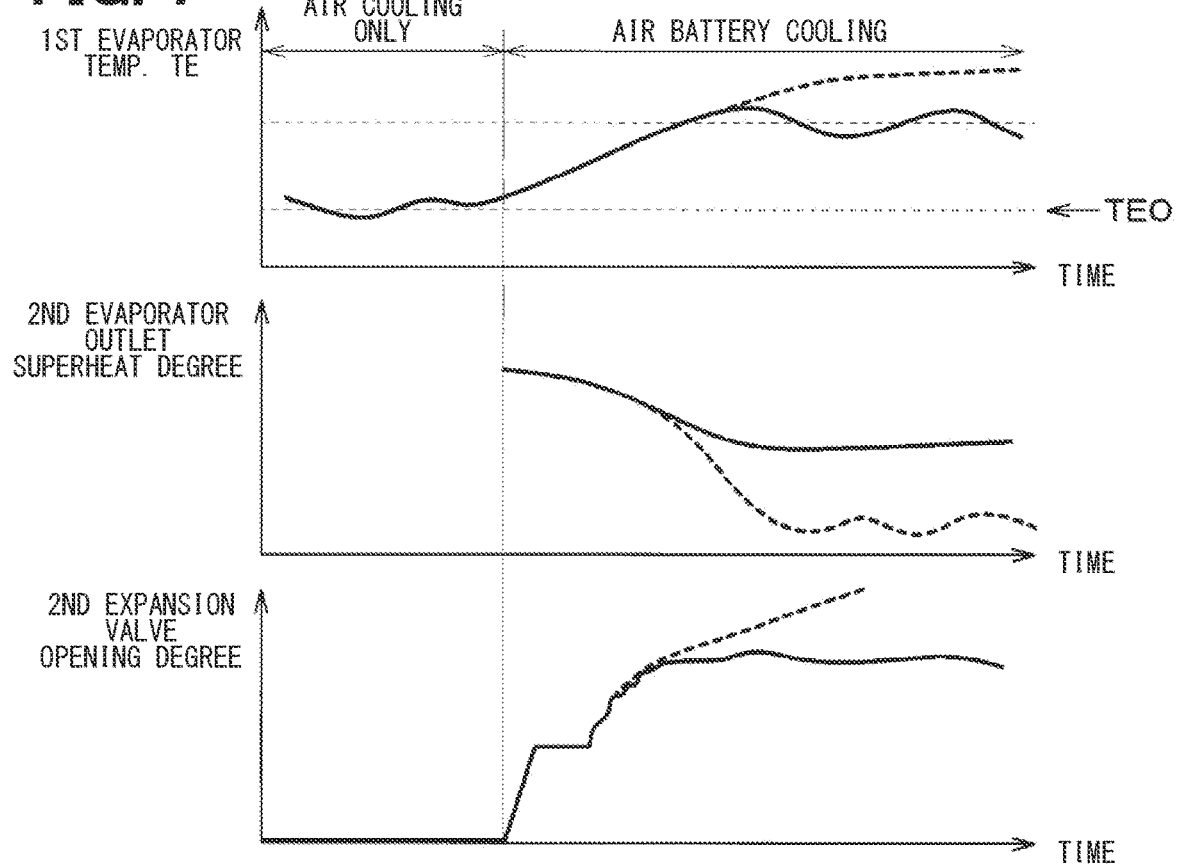
FIG. 7 is a time chart illustrating an operation example of the refrigeration cycle device in the first embodiment.

FIG. 7 illustrates an operation example in this embodiment. In this operation example, the air-cooling single operation is firstly operated.

During the air-cooling single operation, the second expansion valve 15 is closed and all amount of the refrigerant in the refrigeration cycle device 10 flows through the first evaporator 14 without flowing through the second evaporator 16. At this time, the rotational speed of the compressor 11 is controlled such that the temperature TE of the first evaporator 14 becomes the target evaporator temperature TEO. Thus, the temperature TE of the first evaporator 14 is maintained at a temperature close to the target evaporator temperature TEO.

When the temperature of the battery 2 increases and the battery controller 75 transmits the battery cooling request, the second expansion valve 15 is opened and the operation mode is shifted to the air battery cooling operation. During the air battery cooling operation, the refrigerant of the refrigeration cycle device 10 is distributed to the first evaporator 14 and the second evaporator 16.

Thus, the rotational speed of the compressor 11 is increased such that the temperature TE of the first evaporator 14 reaches the target evaporator temperature TEO. When the air-cooling capacity of the first evaporator 14 is insufficient while the rotational speed of the compressor 11 becomes a maximum rotational speed, the temperature TE of the first evaporator 14 gradually increases.

The superheat degree control of the second expansion valve 15 is executed until the difference between the temperature TE of the first evaporator 14 and the target evaporator temperature TEO exceeds the acceptable temperature difference ΔTE. That is, the opening degree of the second expansion valve 15 is controlled such that the superheat degree of the refrigerant in the outlet side of the second evaporator 16 becomes a predetermined superheat degree, so that the superheat degree of the refrigerant on the outlet side of the second evaporator 16 is gradually decreased.

When the temperature TE of the first evaporator 14 further increases and the difference between the temperature TE of the first evaporator 14 and the target evaporator temperature TEO exceeds the acceptable temperature difference ΔTE, the capacity limit control for the second expansion valve 15 is executed. That is, during the capacity limit control, the increasing amount of the opening degree of the second expansion valve 15 is decreased in comparison with that in the superheat degree control.

Broken lines in FIG. 7 show an operation in which the superheat degree control is hypothetically continued without performing the capacity limit control. As shown in FIG. 7, during the capacity limit control, the opening degree of the second expansion valve 15 is kept smaller compared to during the superheat degree control, so that the amount of the refrigerant flowing through the second evaporator 16 is reduced and the amount of the refrigerant flowing through the first evaporator 14 is increased.

Thus, the temperature TE of the first evaporator 14 is restricted from increasing and the superheat degree of the refrigerant in the outlet side of the second evaporator 16 is restricted from decreasing.

As a result, the air-cooling capacity of the first evaporator 14 is preferentially secured compared to the battery-cooling capacity of the second evaporator 16, so that the temperature of the air to be blown into the vehicle cabin is restricted from increasing.

As described in FIG. 5, the acceptable temperature difference ΔTE is altered to a large value when the temperature of the battery 2 becomes high. Thus, when the temperature of the battery 2 becomes high, not the capacity limit control but the superheat degree control is executed, so that the superheat degree of the refrigerant on the outlet side of the second evaporator 16 reaches the target superheat degree. Therefore, the battery-cooling capacity of the second evaporator 16 is preferentially secured compared to the air-cooling capacity of the first evaporator 14 and the temperature of the battery 2 is restricted from increasing.

When the superheat degree control is continued, the temperature of the cooling water flowing through the second evaporator 16 and the temperature of the battery 2 are gradually decreased. As described in FIG. 6, when the difference calculated by subtracting the current temperature of the cooling water from the target temperature of the cooling water flowing through the second evaporator 16 exceeds the opening valve value Tw1, the battery 2 does not need to be cooled and the second expansion valve 15 is closed to prevent the refrigerant from flowing into the second evaporator 16. The temperature of the battery 2 increases by stopping the flow of the refrigerant into the second evaporator 16.

As described in FIG. 6, when the difference calculated by subtracting the current temperature of the cooling water in the low-temperature cooling water circuit 20 from the target temperature of the cooling water in the low-temperature cooling water circuit 20 is less than the opening valve value Tw1, the second expansion valve 15 is opened and the refrigerant is allowed to flow into the second evaporator 16. Thus, the battery 2 is cooled.

By repeating this, the cooling water flowing through the second evaporator 16 and the temperature of the battery 2 can be adjusted within a range including a target temperature.

As described above, the acceptable temperature difference ΔTE is altered to a large value when the temperature of the battery 2 becomes high. Thus, the battery-cooling capacity of the second evaporator 16 is preferentially secured compared to the air-cooling capacity of the first evaporator 14 and the temperature of the battery 2 is restricted from increasing.

However, when the temperature of the battery 2 cannot be restricted from increasing even if the acceptable temperature difference ΔTE is set to a large value and when the temperature of the battery 2 becomes a value close to the upper limit temperature, the first expansion valve 13 is closed and the second expansion valve 15 is opened to shift to the battery-cooling single operation. As a result, all amount of the refrigerant in the refrigeration cycle device 10 flows through the second evaporator 16 without flowing through the first evaporator 14 and the battery-cooling is performed at a high capacity. Thus, the temperature of the battery 2 is surely decreased.

In this embodiment, as described in steps S330 to S350, the controller 50 is configured to switch between the superheat degree control and the capacity limit control. During the superheat degree control, the throttle opening of the second expansion valve 15 is controlled based on the superheat degree (i.e., a refrigerant state) of the refrigerant on the outlet side of the second evaporator 16. During the capacity limit control, the throttle opening of the second expansion valve 15 is controlled based on the temperature TE of the first evaporator 14.

The controller 50 switches to the capacity limit control when the temperature TE of the first evaporator 14 is equal to or greater than a switching temperature during the superheat degree control.

Accordingly, during the superheat degree control, the battery-cooling capacity of the second evaporator 16 is preferentially exhibited. During the capacity limit control, the air-cooling capacity of the first evaporator 14 is preferentially exhibited.

The controller 50 switches the superheat degree control to the capacity limit control when the temperature TE of the first evaporator 14 is equal to or greater than the switching temperature during the superheat degree control.

Thus, when the air-cooling capacity is degreased during the superheat degree control, the superheat degree control is switched to the capacity limit control and the air-cooling capacity is preferentially secured compared to the battery-cooling capacity.

During the superheat degree control, the throttle opening of the second expansion valve 15 may be controlled based on a refrigerant state in the second evaporator 16.

During the capacity limit control, the throttle opening of the second expansion valve 15 may be controlled based on at least one of the temperature of the first evaporator 14, the temperature of the refrigerant flowing through the first evaporator 14, and the temperature of the air having exchanged heat in the first evaporator 14.

The controller 50 may switch the superheat degree control to the capacity limit control when the at least one of the temperatures is equal to or greater than the switching temperature.

In this embodiment, as shown in FIG. 5, the higher the temperature of the battery 2 is, the higher switching temperature the controller 50 sets. The controller 50 may set a switching temperature to a higher value as the temperature of the cooling water for the battery 2 increases.

As a result, when a necessary to cool the battery 2 is high, the battery cooling capacity is restricted from being limited. That is, the battery cooling capacity is restricted from being excessively limited.

In this embodiment, as shown in FIG. 6, the controller 50 switches between the superheat degree control and the capacity limit control by opening the second expansion valve 15 when the temperature of the cooling water in the low-temperature cooling water circuit 20 exceeds an opening valve temperature. The controller 50 does not perform both the superheat degree control and the capacity limit control by closing the second expansion valve 15 when the temperature of the cooling water in the low-temperature cooling water circuit 20 is less than a closing valve temperature. As a result, the battery 2 is cooled in just proportion and the temperature of the battery 2 is kept within a predetermined range.

The controller 50 may switch between the superheat degree control and the capacity limit control by opening the second expansion valve 15 when the temperature of the battery 2 exceeds the opening valve temperature and may refrain from performing both the superheat degree control and the capacity limit control by closing the second expansion valve 15 when the temperature of the battery 2 is less than the closing valve temperature.

In this embodiment, as described in steps S300 to S320, the controller 50 closes the second expansion valve 15 when the temperature of the first evaporator 14 exceeds the predetermined evaporator temperature α, even if the battery 2 needs to be cooled. The controller 50 opens the second expansion valve 15 when the temperature of the first evaporator 14 is equal to or less than the predetermined evaporator temperature α.

Thereby, it is restricted that the air-cooling capacity becomes insufficient by starting to cool the battery 2.

In this embodiment, the controller 50 sets the throttle opening of the second expansion valve 15 or the increasing rate of the throttle opening to a value equal to or less than a predetermined value when starting to cool the battery 2.

Thus, the flow rate of the refrigerant flowing through the first evaporator 14 is restricted from largely decreasing when the cooling of the battery 2 is started, so that the temperature of the air cooled in the first evaporator 14 is restricted from largely increasing.

In this embodiment, the controller 50 set a decreasing rate of the throttle opening of the second expansion valve 15 to a value equal to or less than a predetermined degreasing rate when the battery 2 are not needed to be cooled.

As a result, the flow rate of the refrigerant flowing through the first evaporator 14 is restricted from largely increasing when the cooling of the battery 2 is stopped. Thus, the temperature of the first evaporator 14 is restricted from largely decreased and the first evaporator 14 is restricted from being covered with frosts.

Second Embodiment

Figure 8:
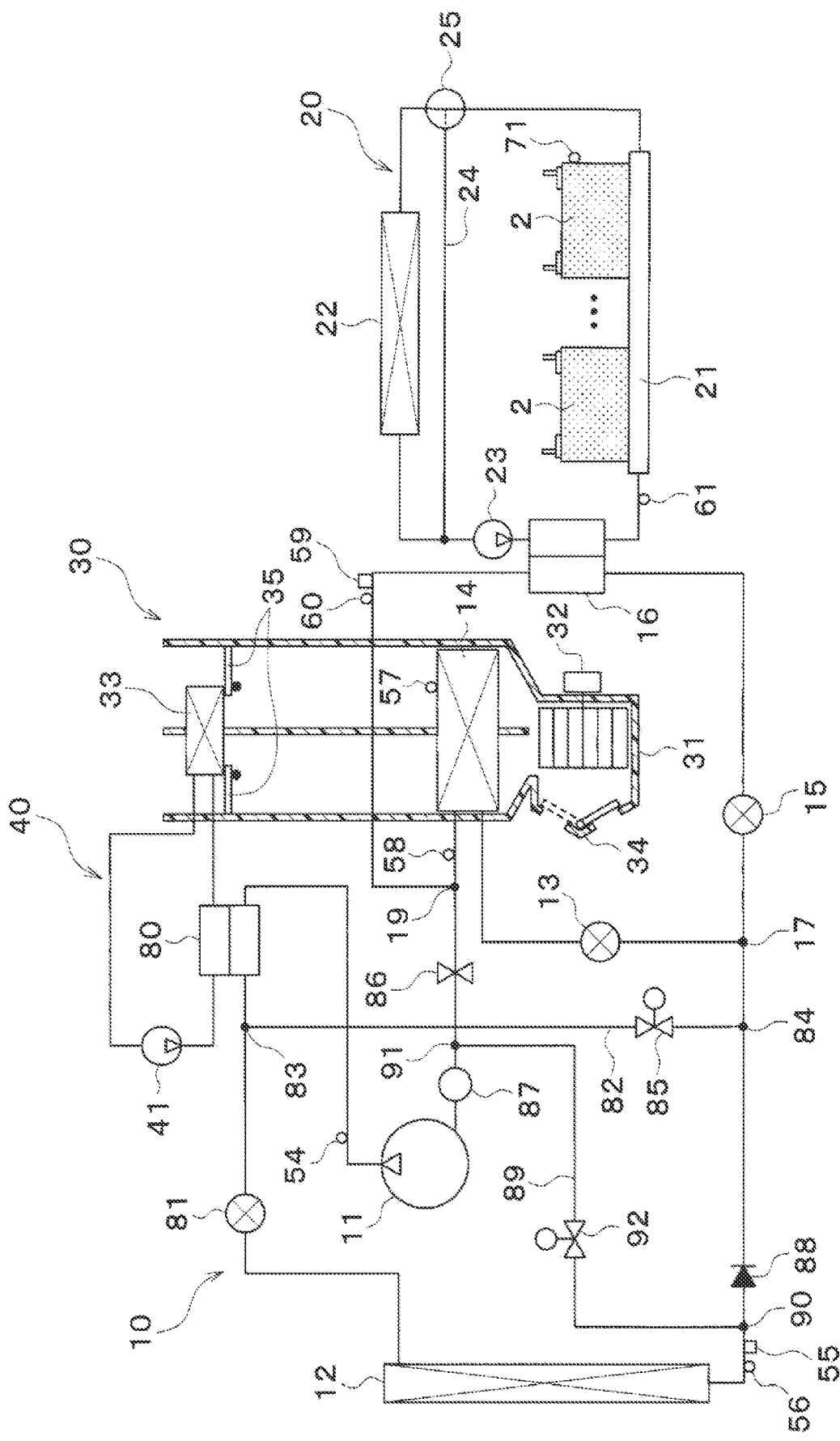
FIG. 8 is an entire configuration diagram of a refrigeration cycle device in a second embodiment.

In the first embodiment described above, the refrigeration cycle device 10 cools both the air conveyed into the vehicle cabin and the battery 2. In this embodiment, as shown FIG. 8, the refrigeration cycle device 10 is configured to cool and heat the air conveyed into the vehicle cabin and cool the battery 2.

Specifically, in the above-described first embodiment, the cooling water in the high-temperature cooling water circuit 40 is heated with a waste heat of the engine 1. However, in this embodiment, the cooling water in the high-temperature cooling water circuit 40 is heated with an air-heating radiator 80.

The air-heating radiator 80 is disposed between the compressor 11 and the radiator 12 in the flow direction of the refrigerant of the refrigeration cycle device 10 and configured to exchange heat between the refrigerant discharged from the compressor 11 and the cooling water in the high-temperature cooling water circuit 40.

Between the air-heating radiator 80 and the radiator 12, an air-heating expansion valve 81 is disposed. The air-heating expansion valve 81 is a third decompression portion that is configured to decompress the high-pressure refrigerant flowing out of the radiator 12 during an air-heating operation. The air-heating expansion valve 81 is an electric variable throttle mechanism that includes a valve element that is changeable in throttle opening and an electric actuator that changes an opening degree of the valve element. The air-heating expansion valve 81 adjusts the decompression amount of the refrigerant by adjusting the opening area of the passage through which the refrigerant flows.

One end of a bypass passage 82 is fluidly connected to a position between an outlet end of the air-heating radiator 80 and an inlet end of the air-heating expansion valve 81 through a third three-way joint 83. The other end of the bypass passage 82 is connected to a position between the outlet end of the radiator 12 and the inlet port of the first three-way joint 17 through a fourth three-way joint 84.

The bypass passage 82 is a refrigerant passage through which the refrigerant flowing out of the air-heating radiator 80 is guided to the inlet port of the first three-way joint 17 while bypassing the air-heating expansion valve 81 and the radiator 12.

The bypass passage 82 includes a bypass opening-closing valve 85. The bypass opening-closing valve 85 is an electromagnetic valve to selectively open and close the bypass passage 82 and an opening and closing of the bypass opening-closing valve 85 is controlled by controlling signals transmitted from the controller 50.

An evaporating pressure adjusting valve 86 is disposed on an outlet side of the second three-way joint 19. The evaporating pressure adjusting valve 86 is a pressure adjusting portion that maintains the pressure of the refrigerant on the outlet side of the first evaporator 14 and on the outlet side of the second evaporator 16 at a value equal to or greater than a standard pressure to restrict the first evaporator 14 and the second evaporator 16 from being covered with frosts.

The evaporating pressure adjusting valve 86 is constituted as a mechanical variable throttle mechanism that increases an opening degree of the valve as the pressure of the refrigerant on the outlet side of the first evaporator 14 increases. As a result, the evaporating pressure adjusting valve 86 can maintain the refrigerant evaporating temperature in the first evaporator 14 at a value that is equal to or higher than the standard temperature in which frosting on the first evaporator 14 can be restricted.

An accumulator 87 is disposed between the outlet end of the evaporating pressure adjusting valve 86 and the drawing port of the compressor 11. The accumulator 87 serves as a gas-liquid separator that separates the refrigerant flowing into the accumulator 87 into a gas-phase and a liquid-phase and accumulates an excess amount of the refrigerant in the cycle. The accumulator 87 has an outlet for the gas-phase refrigerant that is fluidly connected to the drawing port of the compressor 11. Thus, the accumulator 87 restricts the compressor 11 from drawing and compressing the liquid-phase refrigerant.

A check valve 88 is disposed between the outlet end of the radiator 12 and the inlet of the fourth three-way joint 84. The check valve 88 allows the refrigerant from flowing from the outlet end of the radiator 12 to the inlet port of the fourth three-way joint 84 and prohibits the refrigerant from flowing from the inlet port of the fourth three-way joint 84 to the outlet end of the radiator 12. The check valve 88 can prevent the refrigerant joining into the fourth three-way joint 84 from the bypass passage 82 from flowing backward toward the radiator 12.

One end of an air-heating passage 89 is fluidly connected to a position between the outlet end of the radiator 12 and an inlet port of the check valve 88 through a fifth three-way joint 90. The other end of the air-heating passage 89 is fluidly connected to a position between the outlet end of the evaporating pressure adjusting valve 86 and the inlet end of the accumulator 87 through a sixth three-way joint 91.

The air-heating passage 89 is a refrigerant passage through which the refrigerant flowing out of the radiator 12 is guided to the inlet end of the accumulator 87 while bypassing the first expansion valve 13 and the first evaporator 14.

The air-heating passage 89 includes an air-heating opening-closing valve 92. The air-heating opening-closing valve 92 is an electromagnetic valve that selectively opens and closes the air-heating passage 89 and the opening and closing of the air-heating opening-closing valve 92 is controlled by controlling signals transmitted form the controller 50.

By fully opening the air-heating expansion valve 81 and closing the bypass opening-closing valve 85 and the air-heating opening-closing valve 92, the refrigerant does not flow through the bypass passage 82 and the air-heating passage 89, so that the both the air-cooling operation and the battery-cooling operation are performed as with in the above-described embodiment.

By setting the throttle opening of the air-heating expansion valve 81 to a predetermined throttle opening, closing both the bypass opening-closing valve 85 and the air-heating opening-closing valve 92, and opening the first expansion valve 13 at a predetermined throttle opening, a refrigerant circuit through which the refrigerant flows through the compressor 11, the air-heating radiator 80, the air-heating expansion valve 81, the radiator 12, the first expansion valve 13, the first evaporator 14, the evaporating pressure adjusting valve 86, the accumulator 87, and the compressor 11 in this order is constituted.

As a result, the refrigerant absorbs heat in the radiator 12 and the first evaporator 14 and releases heat in the air-heating radiator 80, so that a first dehumidifying heating operation in which the air to be blown into the vehicle cabin is cooled and dehumidified in the first evaporator 14 and heated in the heater core 33 can be operated.

During the first dehumidifying heating operation, the battery 2 can be cooled by opening the second expansion valve 15 at a predetermined throttle opening.

By setting the throttle opening of the air-heating expansion valve 81 to a predetermined throttle opening, opening the bypass opening-closing valve 85, closing the air-heating opening-closing valve 92, and opening the first expansion valve 13 at a predetermined throttle opening, two refrigerant circuits are configured. That is, the refrigerant circuit through which the refrigerant circulates through the compressor 11, the air-heating radiator 80, the air-heating expansion valve 81, the radiator 12, the accumulator 87, and the compressor 11 in this order and the refrigerant circuit through which the refrigerant circulates through the compressor 11, the air-heating radiator 80, the first expansion valve 13, the first evaporator 14, the evaporating pressure adjusting valve 86, the accumulator 87, and the compressor 11 in this order are constituted.

As a result, the refrigerant absorbs heat in the radiator 12 and the first evaporator 14 and releases heat in the air-heating radiator 80, so that a second dehumidifying heating operation in which the air to be blown into the vehicle cabin is cooled and dehumidified in the first evaporator 14 and heated in the heater core 33 can be performed.

During the second dehumidifying heating operation, the temperature of the refrigerant flowing into the radiator 12 can be lowered compared to a case during the first dehumidifying heating operation, so that an absorbing amount of heat from the outside air is increased and the air-heating capacity can be increased.

During the second dehumidifying heating operation, the second expansion valve 15 is opened at a predetermined throttle opening, so that the battery 2 are also cooled.

By setting the air-heating expansion valve 81 to a predetermined throttle opening degree, closing the bypass opening-closing valve 85, opening the air-heating opening-closing valve 92, and closing the first expansion valve 13, a refrigerant circuit through which the refrigerant circulates through the compressor 11, the air-heating radiator 80, the air-heating expansion valve 81, the radiator 12, the accumulator 87, and the compressor 11 in this order is constituted.

As a result, the refrigerant absorbs heat in the radiator 12 and releases heat in the air-heating radiator 80, so that an air-heating operation in which the air to be blown into the vehicle cabin is heated without being cooled and dehumidified in the first evaporator 14 can be performed.

The battery 2 are also cooled by opening the second expansion valve 15 at a predetermined throttle opening during the air-heating operation.

By fully opening the air-heating expansion valve 81, closing the bypass opening-closing valve 85, the air-heating opening-closing valve 92, and the first expansion valve 13, opening the second expansion valve 15 at a predetermined throttle opening, a refrigerant circuit through which the refrigerant circulates through the compressor 11, the air-heating radiator 80, the air-heating expansion valve 81, the radiator 12, the second expansion valve 15, the second evaporator 16, the evaporating pressure adjusting valve 86, the accumulator 87, and the compressor 11 in this order is constituted.

As a result, the refrigerant absorbs heat in the second evaporator 16 and releases heat in the radiator 12 to cool the battery 2.

According to this embodiment, both the cooling and heating in the vehicle cabin and the cooling of the battery 2 can be performed in a vehicle that does not have an engine such as an electric vehicle.

The air-heating radiator 80 is configured to exchange heat between the refrigerant discharged from the compressor 11 and the cooling water in the high-temperature cooling water circuit 40, but the present discloser is not limited to this configuration. For example, the air-heating radiator 80 may be housed in the air-conditioner case 31 in place of the heater core 33 and may be configured to exchange heat between the refrigerant discharged from the compressor 11 and the air having passed through the first evaporator 14 to heat the air having passed through the first evaporator 14.

Third Embodiment

Figure 9:
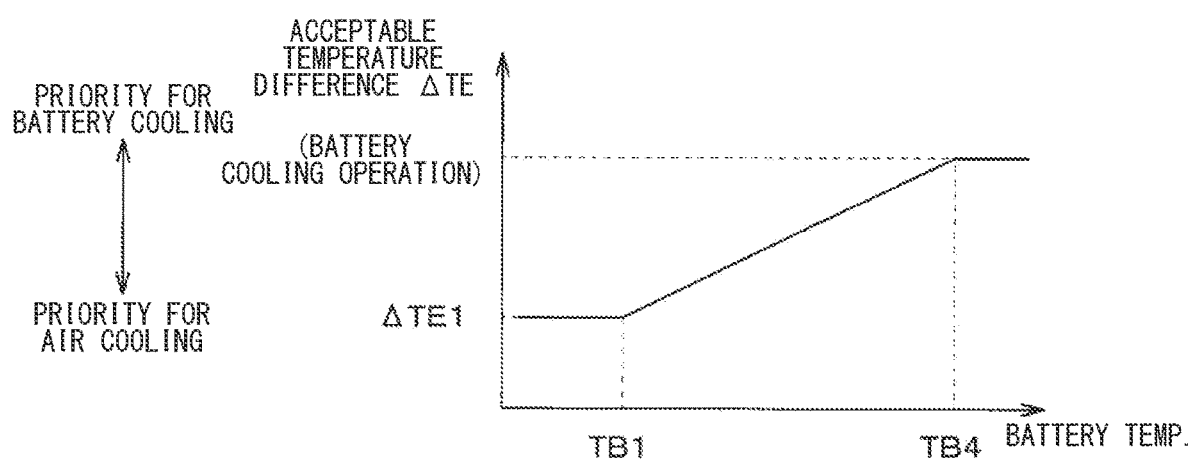
FIG. 9 is a controlling characteristic diagram for calculating an acceptable temperature difference in a controlling process executed by a controller of the refrigeration cycle device in the second embodiment.

In the above-described embodiment, the acceptable temperature difference $\Delta TE$ is increased stepwise as the level of the battery cooling request increases. In this embodiment, as shown in FIG. 9, the acceptable temperature difference $\Delta TE$ is continuously increased (e.g., linearly increased in FIG. 9) as the battery cooling request is increased.

In this embodiment the acceptable temperature difference $\Delta TE$ can be finely altered according to the temperature of the battery 2, so that the superheat degree control and the capacity limit control can be more appropriately switched.

In the embodiments described above, R1234yf is employed as the refrigerant, but the refrigerant is not limited to the above example. For example, R134a, R600a, R410A, R404A, R32, R407C, and the like may be employed. A mixture refrigerant in which multiple kinds of those refrigerants are mixed together may be used.

Carbon dioxide may be employed as the refrigerant to configure a supercritical refrigeration cycle in which the high-pressure side refrigerant pressure is equal to or higher than the critical pressure of the refrigerant.

In the above embodiments, the temperature TE of the first evaporator 14 is detected by the first evaporator temperature sensor 57 but the temperature TE of the first evaporator 14 may be estimated. The temperature TE of the first evaporator 14 may be substituted by a physical quantity such as a pressure and a volume.

The temperature of the refrigerant flowing through the first evaporator 14, the temperature of the air having exchanged heat in the first evaporator 14, and other various temperatures may be detected by the temperature sensors or estimated. These temperatures may be substituted by physical quantities such as pressures and volumes.

Although the present disclosure has been described in accordance with the embodiments, it is understood that the present disclosure is not limited to the embodiments and structures disclosed therein. The present disclosure also includes various modifications and variations within an equivalent range. In addition, while the various combinations and configurations, which are preferred, other combinations and configurations, including more, less or only a single element, are also within the spirit and scope of the present disclosure.

What is claimed is:

1. A refrigerant cycle device for a vehicle comprising:
    a compressor that is configured to draw and discharge a refrigerant;
    a radiator that is configured to radiate a heat of the refrigerant discharged from the compressor;
    a first expansion valve and a second expansion valve that are disposed in parallel with each other and configured to decompress the refrigerant having released the heat in the radiator;
    a first evaporator that is configured to exchange heat between the refrigerant having been decompressed by the first expansion valve and an air to be blown to a vehicle cabin to evaporate the refrigerant;
    a second evaporator that is configured to exchange heat between the refrigerant having been decompressed by the second expansion valve and a heat medium for cooling a battery; and a controller that is configured to control a throttle opening of the second expansion valve, wherein the controller is configured to switch between a first evaporator priority control and a second evaporator priority control, the controller is configured to:

control the throttle opening of the second expansion valve according to a refrigerant condition in the second evaporator during the second evaporator priority control; and control the throttle opening of the second expansion valve according to at least one of a temperature of the first evaporator, a temperature of the refrigerant flowing through the first evaporator, and a temperature of the air having exchanged heat in the first evaporator during the first evaporator priority control, and the controller is configured to switch the second evaporator priority control to the first evaporator priority control when the at least one of the temperatures is equal to or higher than a switching temperature in the second evaporator priority control.

2. The refrigerant cycle device according to claim 1, wherein the controller is configured to increase the switching temperature as a temperature of the battery or a temperature of the heat medium increases.

3. The refrigerant cycle device according to claim 1, wherein the controller is further configured to:

switch between the first evaporator priority control and the second evaporator priority control by opening the second expansion valve when a temperature of the heat medium or a temperature of the battery is higher than an opening valve temperature; and refrain from executing both the first evaporator priority control and the second evaporator priority control by closing the second expansion valve when the temperature of the heat medium or the temperature of the battery is lower than the opening valve temperature.

4. The refrigerant cycle device according to claim 1, wherein when the battery needs to be cooled, the controller is configured to:

close the second expansion valve when the temperature of the first evaporator is higher than a predetermined evaporator temperature; and open the second expansion valve when the temperature of the first evaporator is equal to or lower than the predetermined evaporator temperature.

5. The refrigerant cycle device according to claim 1, wherein the controller is further configured to set the throttle opening of the second expansion valve or an increase rate of the throttle opening of the second expansion valve to a value equal to or less than a predetermined value when cooling the battery.

6. The refrigerant cycle device according to claim 1, wherein the controller is configured to set a decrease rate of the throttle opening of the second expansion valve to a value equal to or less than a predetermined decrease rate when the battery does not need to be cooled.

7. The refrigerant cycle device according to claim 1, wherein the controller is further configured to open the second expansion valve and control the throttle opening of the second expansion valve during the second evaporator priority control and open the second expansion valve and control the throttle opening of the second expansion valve during the first evaporator priority control.

\* \* \* \* \*